United States Patent
Yasuhara et al.

(10) Patent No.: US 6,637,107 B2
(45) Date of Patent: Oct. 28, 2003

(54) METHOD OF MANUFACTURING DISK FOR VARIATOR

(75) Inventors: Shinji Yasuhara, Yamatokoriyama (JP); Yoshihiro Ono, Kashiwara (JP); Yasuhiko Hasuda, Kashiwara (JP); Daiji Hiraoka, Nara (JP); Yasuharu Misada, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/070,658

(22) PCT Filed: Jul. 9, 2001

(86) PCT No.: PCT/JP01/05955

§ 371 (c)(1),
(2), (4) Date: Mar. 8, 2002

(87) PCT Pub. No.: WO02/04165

PCT Pub. Date: Jan. 17, 2002

(65) Prior Publication Data

US 2003/0084560 A1 May 8, 2003

(30) Foreign Application Priority Data

Jul. 11, 2000 (JP) ........................................ 2000-209931
Jul. 17, 2000 (JP) ........................................ 2000-216109

(51) Int. Cl.$^7$ ............................ F16H 15/38; B23P 15/00
(52) U.S. Cl. ............................. 29/888; 29/428; 29/558; 476/73
(58) Field of Search ..................... 29/888, 428, 406, 29/464, 557, 558; 476/73, 40

(56) References Cited

U.S. PATENT DOCUMENTS

| | | | | |
|---|---|---|---|---|
| 5,961,415 A | * | 10/1999 | Justice et al. | 475/214 |
| 6,099,431 A | * | 8/2000 | Hoge et al. | 475/216 |
| 2002/0119862 A1 | * | 8/2002 | Goto et al. | 476/73 |

FOREIGN PATENT DOCUMENTS

| | | | |
|---|---|---|---|
| JP | 7-4495 | * | 5/1991 |
| JP | 08-049755 | | 2/1996 |
| JP | 11-197784 | | 7/1999 |
| JP | 2000-061702 | | 2/2000 |

* cited by examiner

*Primary Examiner*—I Cuda Rosenbaum
(74) *Attorney, Agent, or Firm*—Smith, Gambrell & Russell, LLP

(57) ABSTRACT

In a method of fabricating a variator disc, an outer periphery (5) of the input disc (D1), with a spline hole (4) thereof meshed with an input shaft (6), is finished using the input shaft (6) as a working reference. Subsequently, a race (2) is finished with high precisions using the outer periphery (5) as a working reference. There is an alternative method wherein a spline hole (4) with a machining allowance is precisely formed by means of a broach (X) prior to the heat treatment of a blank (B); after hardening the blank (B) by the heat treatment, tooth flanks (4a) of the spline hole (4) are precisely finished by means of a finishing broach (Y); and then, a race (2) of an input disc (D1) is precisely finished using the tooth flanks (4a) as a working reference.

3 Claims, 5 Drawing Sheets

METHOD OF MANUFACTURING DISK FOR VARIATOR

TECHNICAL FIELD

The present invention relates to a method of fabricating a variator disc mounted in a toroidal continuously variable transmission.

BACKGROUND ART

FIG. 5 schematically shows a variator for use in a full toroidal continuously variable transmission as one type of the toroidal continuously variable transmission mounted in vehicles and the like. The variator 10 includes an input shaft 13 driven into rotation by a vehicular power source 12. The input shaft 13 carries an input disc 15 on respective places near opposite ends thereof. The input disc 15 is formed with a spline hole 15a at its center, the spline hole formed with plural lines of spline grooves. The input disc 15 has the spline hole 15a meshed with a spline shaft 13a of the input shaft 13 so that the input disc is rotated in unison with the input shaft 13 as permitted of a minor movement axially of the input shaft 13. The reason for permitting the movement of the input disc 15 is to apply a required load to an end of the variator 10 by, for example, biasing the right-hand input disc 15 toward the left-hand input disc 15, as seen in the figure, by means of a hydraulic cylinder 17 connected with a hydraulic power source 16. The input disc 15 is formed with a concave race 15b on one side surface thereof.

An output portion 18 of the variator 10 is relatively rotatably carried on an axially central portion of the input shaft 13. The output portion 18 includes an output member 19 and a pair of output discs 20 integrally rotatably carried on the output member 19. The output disc 20 is formed with a concave race 20b on one side surface thereof in face-to-face relation with the race 15b of the input disc 15. The output member 19 is formed with a sprocket gear 19a on its periphery, the sprocket gear meshed with a power transmission chain 23. Three disc-like rollers 21 are interposed between the race 15b of the input disc 15 and the race 20b of the output disc 20 in face-to-face relation. The rollers 21 are in rolling contact with the races 15, 20b, as arranged with equal circumferential spacing. Each of the rollers 21 is rotatably carried by a carriage 22, which is adapted to adjust a position of the roller 21 relative to the races 15b, 20b.

Thus, the variator 10 is configured as a so-called double cavity type which includes a pair of sets, each of which consists of the input disc 15, output disc 20 and rollers 21. The variator is arranged such that the input discs 15 transmit torque to the output discs 20 via the six rollers 21. The variator is adapted to vary the speed of rotation (transmission gear ratio) of the output discs 20 by adjusting the positions of the six rollers 21 by means of the carriages 22 (See the two-dot chain line in FIG. 5).

The input disc 15 is formed from, for example, a bearing steel. The input disc is generally fabricated by the steps of heat treating a blank for hardening, the blank formed with the spline hole 15a and the concave race 15b by machining; and then finishing the race 15b by machining or grinding using an inside periphery (surface of minimum inside diameter) of the spline hole 15a as a working reference.

In the variator 10, the individual rollers 21 must evenly contact the races 15b, 20b of the discs 15, 20 at high contact pressure in order to ensure the torque transmission between the input discs 15 and the output discs 20.

However, it is difficult to finish the race 15b of the conventional input disc 15 with high precisions because in the process for finishing the race 15b after the heat treatment, tooth flanks of the spline hole 15a, which are used as the working reference, suffer heat-treatment deformation. In addition, assembly precisions of the input disc 15 with respect to the input shaft 13 depend upon the precisions of fitting the spline hole 15a of the input disc 15 on the spline shaft 13a of the input shaft 13. Hence, the working precisions or the heat-treatment deformation of the spline hole 15a and such will result in a problem such as an inclined axis of the race 15b relative to the axis of the input shaft 13 or the like. Thus, the assembly precisions of these elements are decreased. Accordingly, there occurs misalignment between a center of the curvature of the race 15b of the input disc 15 and that of the race 20b of the output disc 20, thus resulting in the following problems. That is, a particular roller 21 is subjected to such a high contact pressure that the roller 21 and the race 15b are decreased in durability. Otherwise, a particular roller 21 is subjected to a decreased contact pressure, so that the torque transmission becomes unstable. Furthermore, there occurs a so-called uneven contact in which a contact surface between the spline hole 15a and the spline shaft 13a is limited to a particular area. This also results the decreased durability of these elements.

As a solution to these problems, it may be contemplated to precisely finish the tooth flanks of the spline hole 15a by electrical discharge machining after the heat treatment. Unfortunately, however, this approach has another problem of low productivity and high fabrication costs.

It is an object of the invention to provide a method of fabricating a variator disc which favorably ensures the precisions of the race with respect to the input shaft and which features high productivity and low fabrication costs.

It is another object of the invention to provide a method of fabricating a variator disc which provides the high-precision finishing of the spline hole.

DISCLOSURE OF THE INVENTION

In accordance with one aspect of the invention, a method of fabricating a variator disc for use in a variator of a toroidal continuously variable transmission, the disc having a concave race on a side surface thereof for rolling movement of rollers and including a spline hole centrally thereof to be meshed with a spline shaft of an input shaft, the method comprises the steps of: forming a concave race with a machining allowance on a side surface of an annular material; forming the spline hole through a blank formed with the race; heat treating the blank for hardening the same; and in a state where the disc is retained by the input shaft, the spline shaft of which is meshed with the spline hole of the disc after the heat treatment of the blank, finishing an outer periphery of the disc using the input shaft as a working reference, and then finishing the race using the resulting outer periphery as a working reference (claim 1).

According to the method of fabricating the variator disc, the precisions of the race with respect to the input shaft are favorably accomplished because the outer periphery of the disc finished using the input shaft as the working reference is used as the working reference for finishing the race. Therefore, the individual rollers are allowed to evenly contact the race such that the durability of the race and rollers is ensured and that the stable torque transmission is carried out. Furthermore, the method accomplishes higher productivity and lower fabrication costs than a case where the spline hole is finished by electrical discharge machining.

In accordance with another aspect of the invention, a method of fabricating a variator disc for use in a variator of a toroidal continuously variable transmission, the disc having a concave race on a side surface thereof and including a spline hole centrally thereof to be meshed with a spline shaft of an input shaft, the method comprises the steps of: forming a concave race with a machining allowance on a side surface of an annular material: forming the spline hole through a blank formed with the race; heat treating the blank for hardening the same; and in a state where the disc is retained by the input shaft, the spline shaft of which is meshed with the spline hole of the disc after the heat treatment of the blank, finishing the race using the input shaft as a working reference (claim 2).

According to the method of fabricating the variator disc, the precisions of the race with respect to the input shaft are favorably accomplished because the race is finished using the input shaft as the working reference. Therefore, the individual rollers are allowed to evenly contact the race such that the durability of the race and rollers is ensured and that the stable torque transmission is carried out. Furthermore, the method accomplishes higher productivity and lower fabrication costs than the case where the spline hole is finished by the electrical discharge machining.

In accordance with still another aspect of the invention, a method of fabricating a variator disc for use in a variator of toroidal continuously variable transmission, the disc having a concave race on a side surface thereof for rolling movement of rollers and including a spline hole centrally thereof to be meshed with a spline shaft of an input shaft, the method comprises the steps of: forming a concave race with a machining allowance on a side surface of an annular material; forming the spline hole with a machining allowance through a blank formed with the race by means of a broach; heat treating the blank for hardening the same; finishing tooth flanks of the spline hole by means of a broach after the heat treatment of the blank; and finishing the race using the finished tooth flanks of the spline hole as a working reference (claim 3).

According to the method of fabricating the variator disc, the tooth flanks are increased in the precisions because the spline hole is formed by means of the broach before the heat treatment of the blank, and after the heat treatment, the tooth flanks are finished by means of the broach. This permits the race to be finished with high precisions using the tooth flanks of the spline hole as the working reference. Therefore, the precisions of the race with respect to the input shaft are favorably accomplished such that the individual rollers are allowed to evenly contact the races. As a result, the durability of the race and rollers is ensured while the stable torque transmission is carried out. In addition, the method accomplishes higher productivity and lower fabrication costs because the tooth flanks are precisely finished by means of the broach. Furthermore, the uneven contact between the spline hole and the spline shaft is relieved so that the durability of these elements is increased, as well.

BEST MODES FOR CARRYING OUT THE INVENTION

Figure 1:
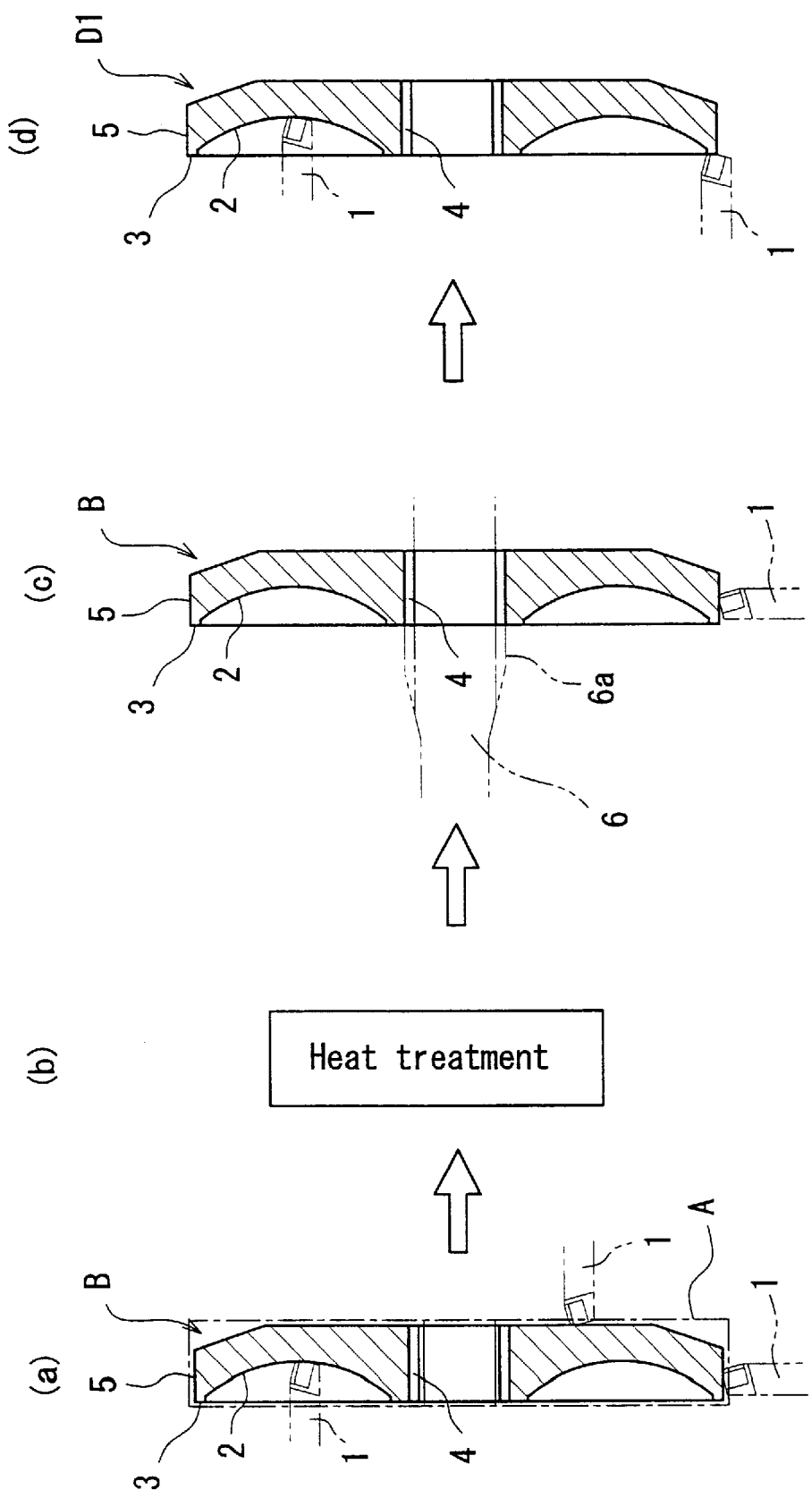
FIGS. 1(a) through 1(d) are diagrams illustrating step of a method of fabricating a variator disc according to one embodiment of the invention.

FIG. 1 shows steps of a method of fabricating a variator disc according to the invention. The fabrication method is applied to the fabrication of an input disc D1 of a variator. First, an annular material A, such as fabricated by forging a bearing steel or the like, is subjected to a machining process using a cutting tool 1 for forming a concave race 2 and an outside circumferential end face 3 on one side surface thereof and forming required portions including the other side surface, an outer periphery and the like into predetermined shapes. In addition, a spline hole 4 is formed at a center of the material A by cutting plural lines of spline grooves (see FIG. 1(a)). The machining of the race 2, outside circumferential end face 3 and outer periphery 5 is performed in a manner to allow for respective machining allowances. On the other hand, the spline hole 4 is formed in dimensions allowing for the heat-treatment deformation such that after the completion of the subsequent heat treatment process, the spline hole 4 may be in conformity with a spline shaft 6a formed on an input shaft 6.

Subsequently, a blank B given by the aforesaid machining process is heat treated to harden the same to a hardness of, for example, HRC 60 to 63 (see FIG. 1(b)).

Then, the spline hole 4 of the hardened blank B is meshed with a corresponding spline shaft 6a of the input shaft 6. In this state, the blank B is shimmed to the input shaft 6 using an unillustrated jig in order to prevent an axial movement of the blank B.

Subsequently, the input shaft 6 is chucked to a lathe for finish machining the outer periphery 5 of the blank B using the chucked input shaft 6 as a working reference. Then, the outside circumferential end face 3 on the one side is finish machined (see FIG. 1(c)). In this manner, the precisions of the outer periphery 5 and the outside circumferential end face 3 with respect to the input shaft 6 are favorably accomplished.

After the completion of the finish machining of the outer periphery 5 and the outside circumferential end face 3, the blank B is removed from the input shaft 6. Then, the blank B is chucked to an NC-lathe at its outer periphery 5 so that the race 2 is finished by means of the cutting tool 1 using the outer periphery 5 as a working reference (see FIG. 1(d)). By using as the working reference the outer periphery 5 having the good precisions with respect to the input shaft 6, the precisions of the race 2 with respect to the input shaft 6 can be accomplished, as well.

Figure 2:
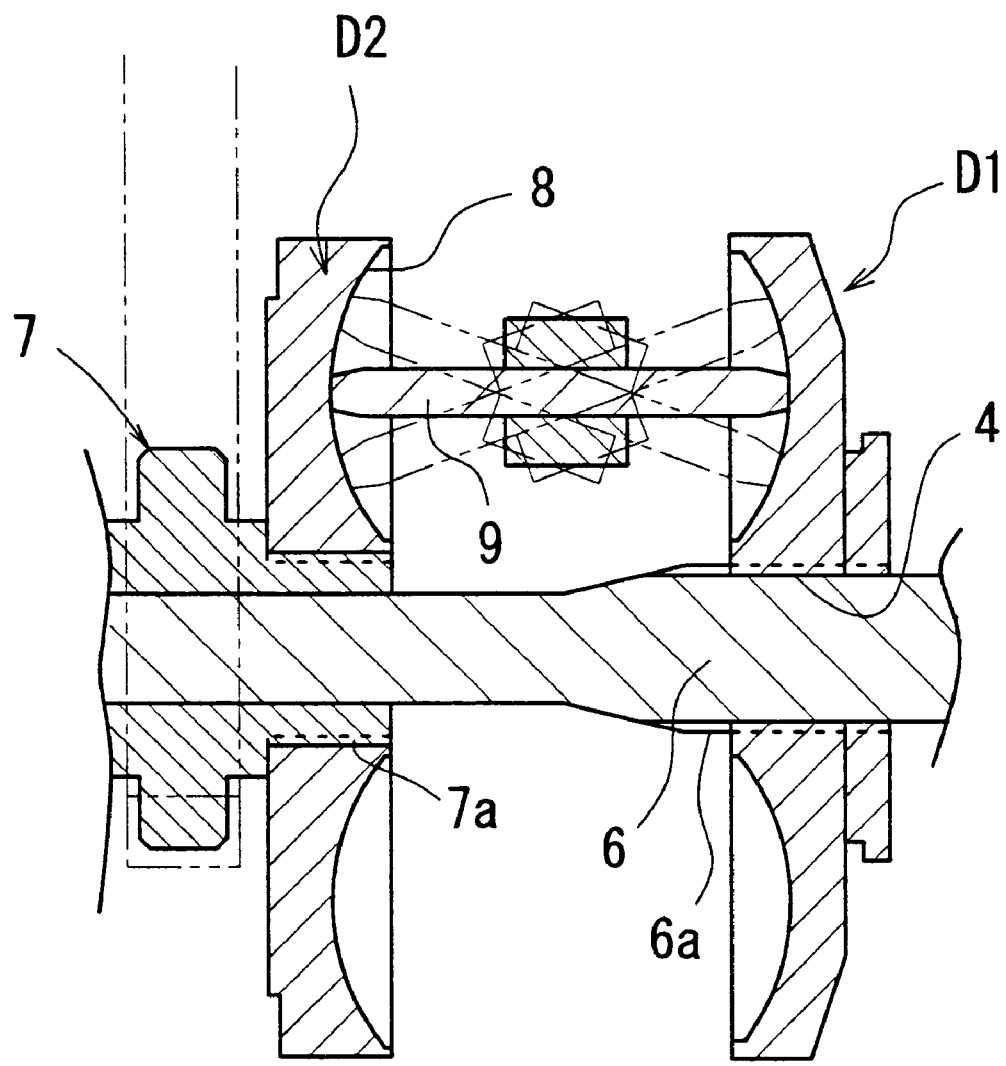
FIG. 2 is a schematic diagram showing an essential part of a variator assembled with an input disc.

The resulting input disc D1 is capable of favorably accomplishing the precisions of the position of the race 2 thereof relative to the axis of the input shaft 6, when placed in a state where the spline hole 4 thereof is meshed with the spline shaft 6a of the input shaft, as shown in FIG. 2. Hence, the occurrence of misalignment between the center of the curvature of the race 2 and that of a race 8 of an output disc D2 can be prevented. Accordingly, individual rollers 9 are in contact with the races 2, 8 at even contact pressure, so that the durability of the races 2, 8 and rollers 9 is ensured and that the stable torque transmission is carried out.

Figure 3:
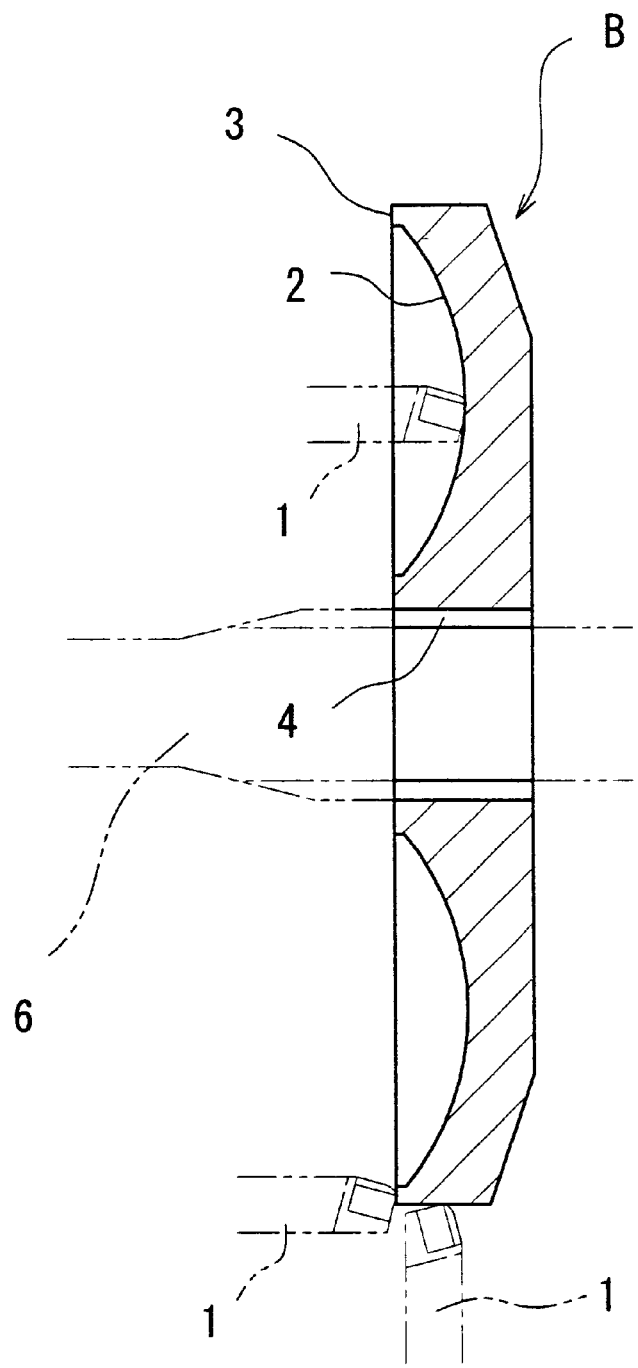
FIG. 3 is a schematic diagram showing another embodiment of the invention.

According to the foregoing embodiment, the race 2 is finished using the outer periphery 5 of the blank B as the working reference. Alternatively, the input shaft 6 with its spline shaft 6a meshed with the spline hole 4 of the blank B may be used as the working reference when the race 2 together with the outer periphery 5 and outside circumferential end face 3 are finished by means of the cutting tool 1 (see FIG. 3). In this case, as well, the precisions of the race 2 with respect to the input shaft 6 can be favorably accomplished.

The blank B may be finished by grinding instead of machining.

Figure 4:
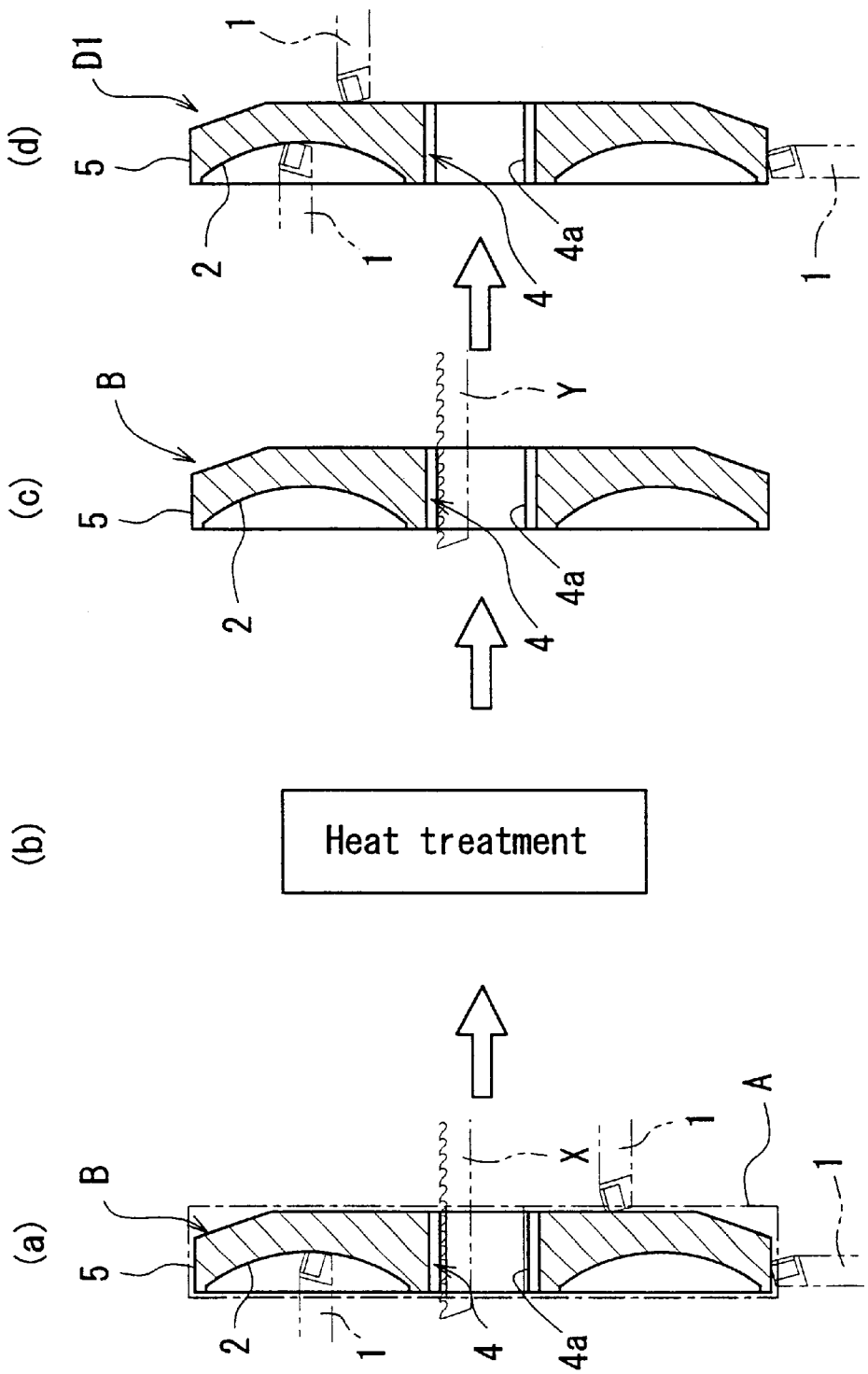
FIGS. 4(a) through 4(d) are diagrams illustrating steps according to still another embodiment of the invention.
Figure 5:
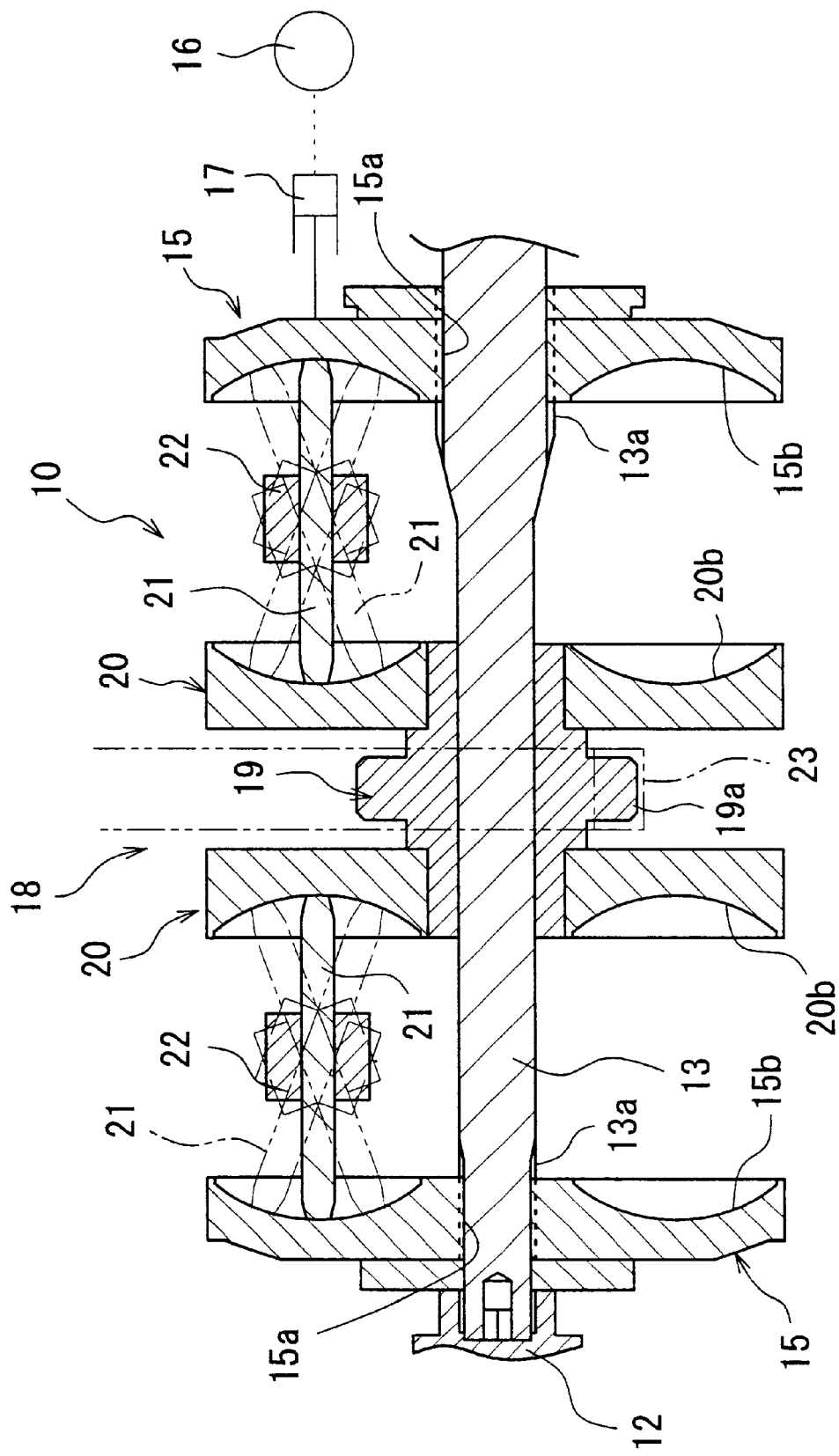
FIG. 5 is a schematic diagram showing a conventional variator.

FIG. 4 shows steps of a method of fabricating a variator disc according to another embodiment of the invention. According to this method, an annular material A, such as fabricated by forging a bearing steel or the like, is first subjected to a machining process using the cutting tool 1 for forming the concave race 2 on one side surface thereof and forming required portions including the other side surface, the outer periphery 5 and the like into predetermined shapes. In addition, the spline hole 4 including plural lines of spline grooves is formed centrally of the material by means of a broach (see FIG. 4(a)). The machining of these portions is performed in a manner to allow for predetermined machining allowances in consideration of the heat-treatment deformation. The spline hole 4, in particular, is machined with good precisions in a manner to allow for predetermined machining allowances at least at side surfaces and inside periphery (surface of minimum inside diameter) of tooth flanks 4a.

Subsequently, a blank B given by the aforesaid machining process is heat treated to harden the same to a hardness of, for example, HRC 60 to 63 (see FIG. 4(b)).

Then, a finishing broach Y is inserted through the spline hole 4 of the hardened blank B for finishing at least the side surfaces and the inside periphery of the tooth flanks 4a (see FIG. 4(c)). Thus, the tooth flanks 4a can be finished with high precisions.

Next, using the inside periphery of the tooth flanks 4a of the spline hole 4 as a working reference, the race 2 on the one side surface of the disc is finished by means of an NC lathe or grinding machine while the required portions on the other side thereof and the outer periphery 5 are finished by turning or grinding (see FIG. 4(d)). In this manner, the input disc D1 for variator is fabricated.

The resulting input disc D1 features the race 2 finished with high precisions because the race 2 is finished using, as the working reference, the tooth flanks 4a of the spline hole 4 precisely finished. Similarly to the input disc shown in FIG. 2, this input disc D1, as assembled to the input shaft 6, can achieve increased fitting precisions of the spline hole 4 thereof with respect to the spline shaft 6a of the input shaft 6. Hence, the race 2 of the input disc D1 is prevented from bodily inclining relative to the axis of the input shaft 6. This leads to the prevention of the misalignment between the center of the curvature of the race 2 and that of the race 8 of the output disc D2. Accordingly, the individual rollers 9 are in contact with the races 2, 8 at even contact pressure, such that the durability of the races 2, 8 and rollers 9 is ensured and that the stable torque transmission is carried out. Furthermore, the spline hole 4 and spline shaft 6a are improved in durability because of the alleviation of the uneven contact therebetween.

In a case where a spline is employed as a structure for coupling the output disc D2 with a sleeve 7a of an output member 7 (see FIG. 2), the foregoing fabrication methods may be applied to the output disc D2.

Although the full-toroidal continuously variable transmission is described in the foregoing embodiments, the above fabrication methods may be applied to a disc with a spline hole for use in a half-toroidal continuously variable transmission.

What is claimed is:

1. A method of fabricating a variator disc for use in a variator of a toroidal continuously variable transmission, said disc having a concave race on a side surface thereof for rolling movement of rollers and including a spline hole centrally thereof to be meshed with a spline shaft of an input shaft, said method comprising the steps of:

forming a concave race with a machining allowance on a side surface of an annular material;

forming said spline hole through a blank formed with said race;

heat treating said blank for hardening the same; and in a state where said disc is retained by said input shaft, said spline shaft of which is meshed with said spline hole of said disc after the heat treatment of said blank, finishing an outer periphery of said disc using said input shaft as a working reference, and then finishing said race using said resulting outer periphery as a working reference.

2. A method of fabricating a variator disc for use in a variator of a toroidal continuously variable transmission, said disc having a concave race on a side surface thereof for rolling movement of rollers and including a spline hole centrally thereof to be meshed with a spline shaft of an input shaft, said method comprising the steps of:

forming a concave race with a machining allowance on a side surface of an annular material;

forming said spline hole through a blank formed with said race;

heat treating said blank for hardening the same; and in a state where said disc is retained by said input shaft, said spline shaft of which is meshed with said spline hole of said disc after the heat treatment of said blank, finishing said race using said input shaft as a working reference.

3. A method of fabricating a variator disc for use in a variator of a toroidal continuously variable transmission, said disc having a concave race on a side surface thereof for rolling movement of rollers and including a spline hole centrally thereof to be meshed with a spline shaft of an input shaft, said method comprising the steps of:

forming a concave race with a machining allowance on a side surface of an annular material;

forming said spline hole with a machining allowance through a blank formed with said race by means of a broach;

heat treating said blank for hardening the same;

finishing tooth flanks of said spline hole by means of a broach after the heat treatment of said blank; and finishing said race using said finished tooth flanks of said spline hole as a working reference.

* * * * *